United States Patent
Meier

(10) Patent No.: US 7,382,906 B2
(45) Date of Patent: Jun. 3, 2008

(54) METHOD OF DETERMINING THE REGION OF INTEREST IN IMAGES OF SKIN PRINTS

(75) Inventor: Reinhard Meier, Buxtehude (DE)

(73) Assignee: NXP B.V., Eindhoven (NL)

( * ) Notice: Subject to any disclaimer, the term of this patent is extended or adjusted under 35 U.S.C. 154(b) by 470 days.

(21) Appl. No.: 10/535,550

(22) PCT Filed: Nov. 14, 2003

(86) PCT No.: PCT/IB03/05163

§ 371 (c)(1),
(2), (4) Date: May 18, 2005

(87) PCT Pub. No.: WO2004/047005

PCT Pub. Date: Jun. 3, 2004

(65) Prior Publication Data

US 2006/0050936 A1 Mar. 9, 2006

(30) Foreign Application Priority Data

Nov. 21, 2002 (DE) ................................ 102 54 327

(51) Int. Cl.
*G06K 9/46* (2006.01)
*G06K 9/80* (2006.01)

(52) U.S. Cl. .................................................... 382/125

(58) Field of Classification Search ................ None
See application file for complete search history.

(56) References Cited

U.S. PATENT DOCUMENTS

| 6,263,091 B1 | 7/2001 | Jain et al. |
| 6,798,908 B2 * | 9/2004 | Miyatake et al. ........... 382/190 |
| 6,876,757 B2 * | 4/2005 | Yau et al. ................... 382/125 |

FOREIGN PATENT DOCUMENTS

WO    WO 02 091285    11/2002

* cited by examiner

*Primary Examiner*—Brian P. Werner
*Assistant Examiner*—Elisa M Rice
(74) *Attorney, Agent, or Firm*—Peter Zawilski

(57) ABSTRACT

In a method of determining the region of interest in images of skin impressions, the skin having ridges and valleys and the images taking the form of image data, values within a first value range being assigned to the ridges and values within a second value range of the image data being assigned to the valleys, the values of the overall image are shifted in the direction of the first value range. The overall image is split into tiles. Mean values of the shifted values for the individual tiles are compared with a reference value. Those tiles whose mean value deviates relative to the reference value in the direction of the first value range are considered at least on a preliminary basis as belonging to the region of interest.

6 Claims, 4 Drawing Sheets

METHOD OF DETERMINING THE REGION OF INTEREST IN IMAGES OF SKIN PRINTS

FIELD OF THE INVENTION

The invention relates to a method of determining the region of interest in images of skin prints, the skin having ridges and valleys and the images taking the form of image data, values within a first value range being assigned to the ridges and values within a second value range of the image data being assigned to the valleys.

BACKGROUND OF THE INVENTION

For automatic detection of skin print images, in particular finger prints, the skin area to be imaged, in particular the finger tip, is scanned by a sensor. The skin area is positioned on a surface, which is transparent in the case of optical scanning. However, the detection area of the sensor is generally rectangular, the region of interest not usually occupying the entire area detected by the sensor. Image fractions thereby arise which may disturb subsequent evaluation.

It is therefore an object of the present invention to determine the region of interest, such that subsequent image processing steps may be limited to the information contained in the region of interest.

SUMMARY OF THE INVENTION

This object is achieved according to the invention in that the values of the overall image are shifted in the direction of the first value range, in that the overall image is divided into tiles, in that mean values of the shifted values for the individual tiles are compared with a reference value and in that those tiles whose mean value deviates relative to the reference value in the direction of the first value range are considered at least on a preliminary basis as belonging to the region of interest.

Sensors of various types may be used to scan skin print images, for example optical, capacitive or pressure sensors. In the case of optical sensors, the depressions known as valleys in the finger print may be bright and the ridges (elevations) may be dark. The first value range has then accordingly to be assigned to lower brightness values and the second value range has to be assigned to higher brightness values. In addition, the background, i.e. the area not belonging to the region of interest, may be bright or dark in the case of optical sensors, the method according to the invention being applicable.

Particularly favorable shifting of the value range may be effected according to another development in that, to shift the values, each tile is split into a plurality of groups of pixels distributed extensively uniformly over the tiles, in that, for each tile and each group, the minimum of the corresponding values is formed, in that, for each tile, the mean value is calculated by means of the minimum values of the groups and in that the mean value is stored as a property of the respective tile.

The method according to the invention indicated above may also be further developed in that, for the tiles not yet deemed to belong to the region of interest, the variance of the gray scale values within each tile in the unchanged image data is calculated and in that an evaluation of these tiles is effected as a function of the mean value, the variance and a reference value in such a way that a difference between the mean value and the reference value, which in itself indicates lack of belonging to the region of interest, may be compensated by an appropriately large variance and a difference which indicates belonging to the region of interest may be compensated by an appropriately small variance. This further development allows yet more tiles to be examined as to whether they belong to the region of interest.

Another development consists in the fact that each tile is then examined as to whether more than five or fewer than six of the tiles surrounding it have been assessed as belonging to the region of interest, wherein in the case of more than five the examined tile is assessed as belonging to the region of interest and in the case of fewer than six the examined tile is assessed as not belonging to the region of interest. Thus, disperse tiles considered previously as belonging to the region of interest but which lie outside the regions of interest are discarded and individual tiles which should be counted as part of the region of interest but have hitherto not been assessed accordingly are included in the region of interest. It has proven particularly favorable for this step to be repeated three times.

If a finger tip is pressed onto a flat surface, it may be assumed that the region of interest has a form without holes and without large "inlets". Such a form is also characterized in that each horizontal and each vertical straight line intersects only once with the region of interest.

In order to obtain such a region of interest, another development of the method according to the invention is characterized in that the hitherto determined region of interest is investigated for "inlets" and in that tiles lying in "inlets" are assumed to belong to the region of interest. This method may in particular be advantageously performed in that, on each side of the hitherto determined region of interest, pointers starting from both ends of the side are in each case positioned on the outermost tile determined as belonging to the region of interest, wherein the pointers travel towards one another and row by row adopt the position of a tile lying further outwards or retain the same position in the case of an "inlet" and in that the path of the pointers until the pointers meet forms the respective border of the final region of interest.

BRIEF DESCRIPTION OF THE DRAWINGS

The invention will be further described with reference to examples of embodiments shown in the drawings to which, however, the invention is not restricted. In the Figures.

DESCRIPTION OF PREFERRED EMBODIMENTS

Figure 1A:
FIG. 1 shows finger print images in various phases of the method.
Figure 1B:
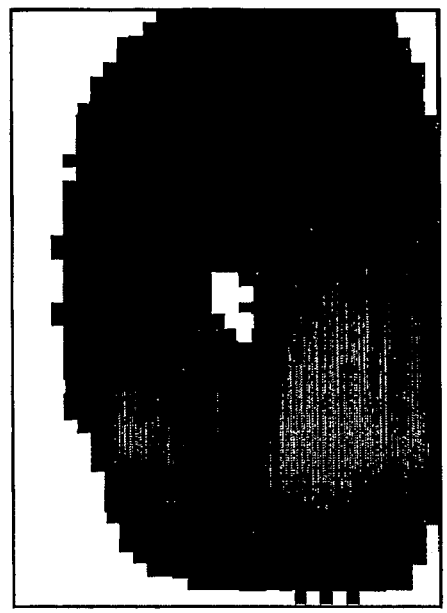
Figure 1C:
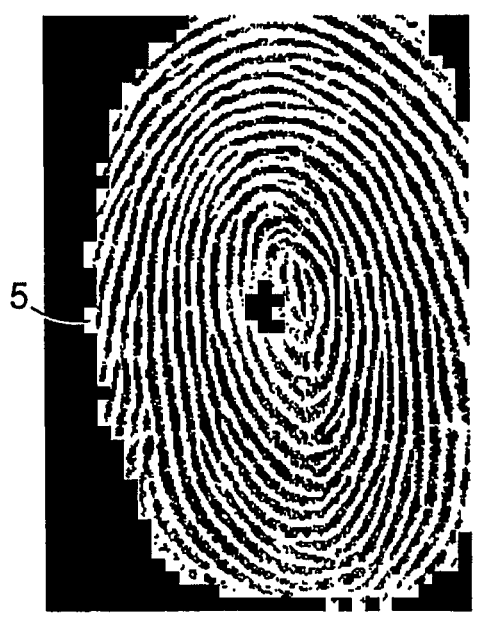
Figure 4:
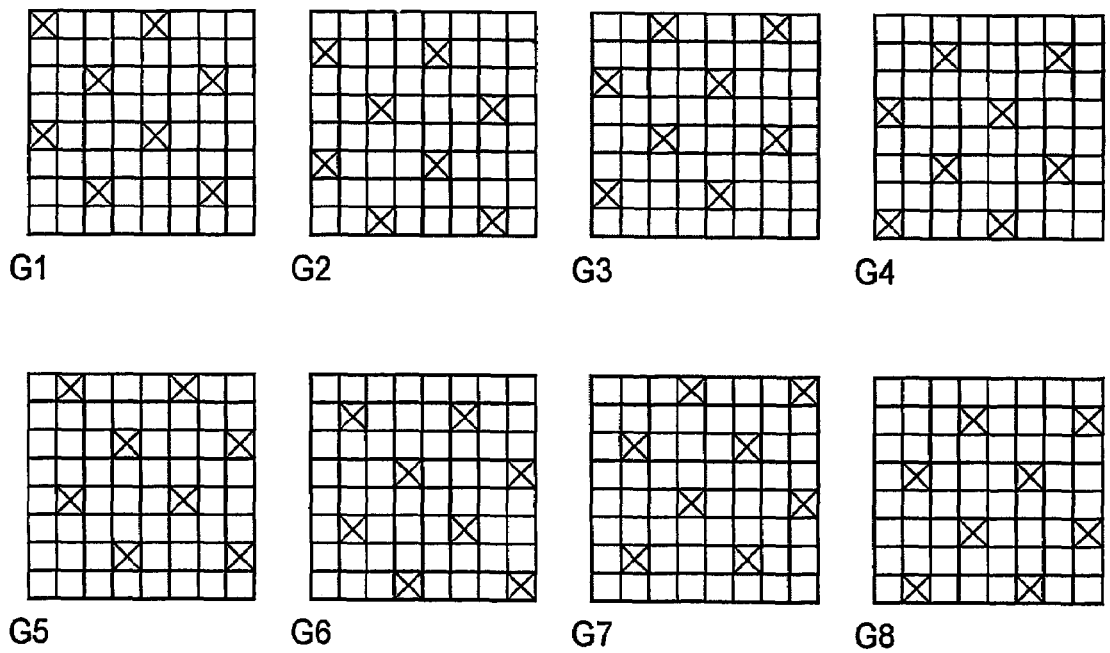
FIG. 4 is a schematic representation for performing a first method step and FIG. 5 is a schematic representation for performing a further method step.

In the example of embodiment illustrated, it is assumed that the valleys 1 in the finger print are brighter and the ridges 2 are dark. An image 4 is also produced with a bright background 3. Such an image is shown in FIG. 1a. First of all, the image is split without overlap into square tiles, which contain for example 8×8 pixels and which are visible in FIGS. 1b to 1d. These tiles are darkened by balanced use of minimum and mean values in those areas which belong with higher probability to the region of interest. A particularly favorable type of darkening is explained below with reference to FIG. 4. Each tile, of which only one is illustrated in FIG. 4, is split into a plurality of groups G1 to G8. Each of these groups taken individually is intended to be distributed as evenly as possible over the tiles. If all the groups G1 to G8 are assembled, the original tile is produced, such that each point of the tile occurs in precisely one group.

FIG. 4 shows an example of a tile 8 pixels by 8 pixels. The minimum gray scale values of the individual points are formed for each tile and each group. The mean value is then calculated for each tile by means of the group minimums. This mean value is stored as the "darkened" property of the tile. The resultant image is a darkened, low-structure, rasterized version of the finger print, in which the region of interest is generally easily visible. Through the balanced use of minimum and mean values, the ridges have a considerable influence on darkening, while few changes occur in the areas outside the region of interest. At the same time, mean value formation prevents individual dark points (mavericks) outside the region of interest from resulting in dark tiles.

Figure 2:
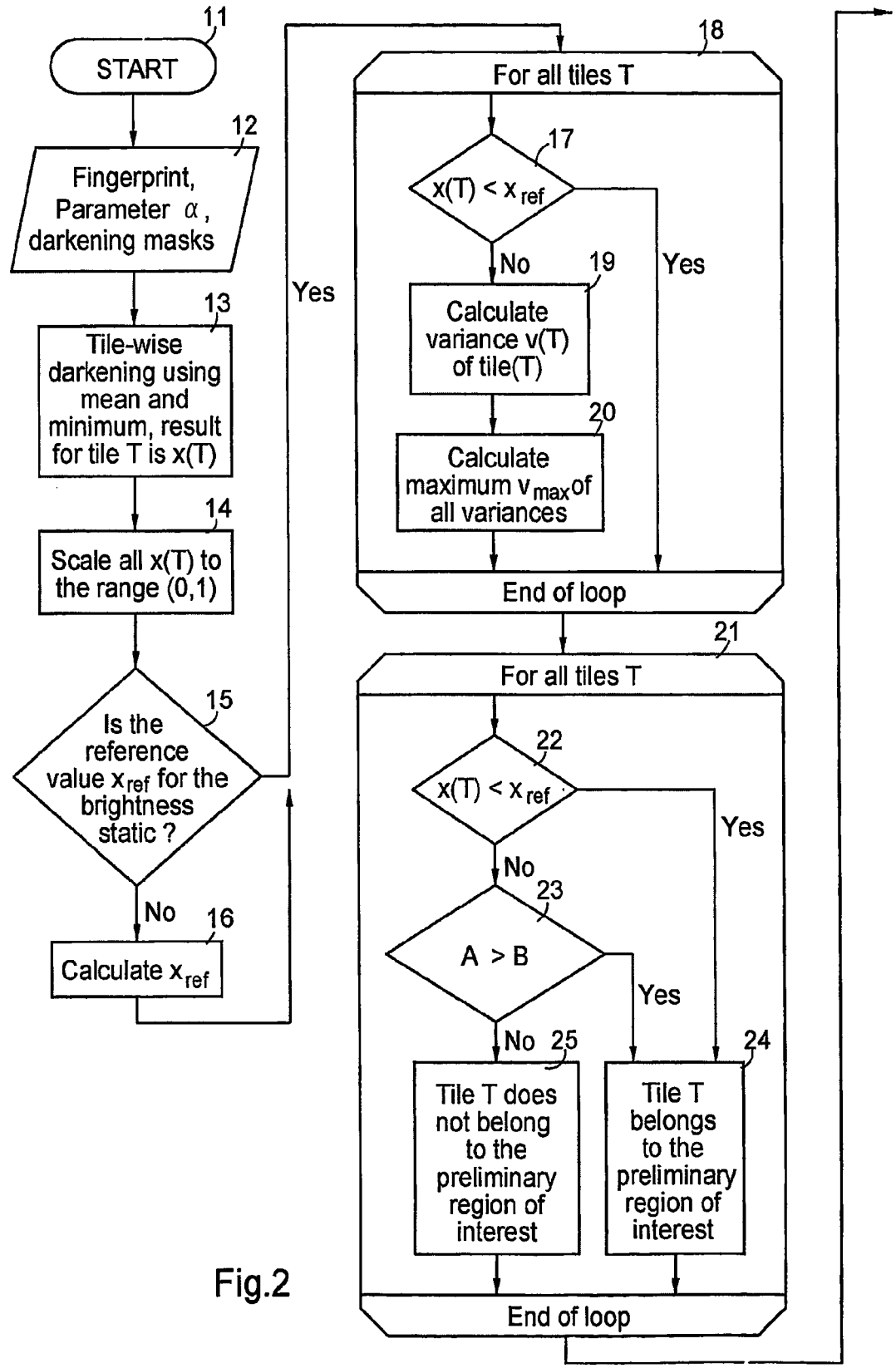
FIG. 2 and FIG. 3 are flowcharts of a program for performing the method according to the invention.
Figure 3:
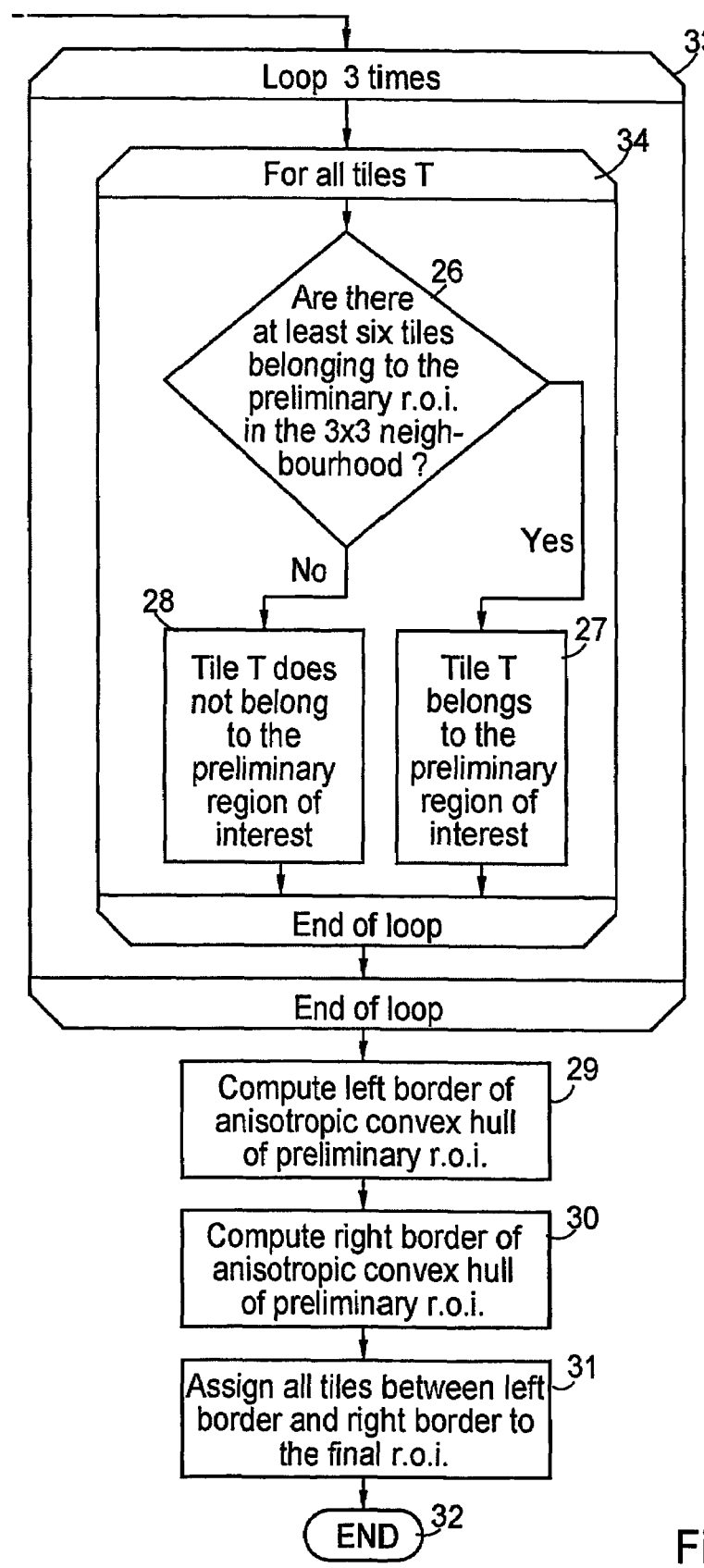

For further explanation of darkening, reference is made below to the flow charts according to FIGS. 2 and 3. After starting at 11, at 12 the finger print, a parameter a, which is required for the process to proceed subsequently, and darkening masks are input. The latter represent the groups according to FIG. 4. Then, in program element 13, darkening is performed tile by tile, wherein, as described above, mean and minimum values are used and a value x(T) is produced for each tile. In a further program step 14, all values x(T) are scaled, such that they adopt a range between 0 and 1.

To compare the values x(T), a reference value $x_{ref}$ is required, which, depending on the application, may be fixedly preset or calculated in each case from the image content. To this end, at 15 the program is branched, depending on whether or not a fixedly preset (static) reference value $x_{ref}$ is to be used for calculation. If this is not the case, the reference value $x_{ref}$ is calculated at 16.

It is assumed that those tiles for which x(T) is smaller than $x_{ref}$ belong to the region of interest. Corresponding branching 17 takes place in a loop 18, which is passed through for all tiles. The tiles are black in FIG. 1b.

For those tiles to which this condition does not apply, the variance v(T) is calculated at 19. In addition, at 20 the maximum variance $v_{max}$ of all the variances, i.e. all the tiles, is determined. After loop 18, a loop 21 is passed through, likewise for all tiles, in which again branching 22 is provided like the branching 17, to determine which tiles should be deemed as belonging to the preliminary region of interest. For tiles which do not fulfill the condition, a check is performed at 23 as to whether A>B. A is the variance $v(T)/v_{max}$ multiplied by the parameter a and $B=(x_{ref}-x(T))^2$.

If A>B, this means that the respective tile, which by definition lies outside the initially assumed region of interest, exhibits a structure which may be a finger print. In this case, therefore, the respective tile is counted at 24 as one of those belonging to the preliminary region of interest. If the condition A>B is not fulfilled, the respective tile is recorded at 25 as not belonging to the region of interest. This situation is illustrated for example in FIG. 1c, wherein the areas not belonging to the region of interest are black and the preliminary region of interest contains the subsequently to be examined finger print. However, the borders of the preliminary region of interest are still thoroughly irregular. Irregularities, such as for example the protruding tiles, could disturb subsequent evaluation.

Figure 1D:

With the loop 33, described below, inside which a loop 34 is passed through, the borders of the region of interest are therefore smoothed or individual tiles are eliminated which have been recognized in the previous method steps as belonging to the region of interest but which lie outside this surface and vice versa. To this end, it is checked at 26 (FIG. 3) whether at least six tiles of the immediately adjacent tiles have been recognized as belonging to the preliminary region of interest. If this is so, it is confirmed at 27 that the respective tile belongs, while otherwise at 28 said tile is identified as not belonging to the region of interest. This situation is illustrated in FIG. 1d.

The following program steps 29, 30, 31 are designed to eliminate "inlets" and holes in the preliminary region of interest. To this end, first of all a left border of the anisotropic convex hull of the preliminary region of interest is computed at 29. At 30, the right border is computed and at 31 all the tiles between the left and right borders are assigned to the final region of interest. At 32 the program is terminated.

Figure 5:
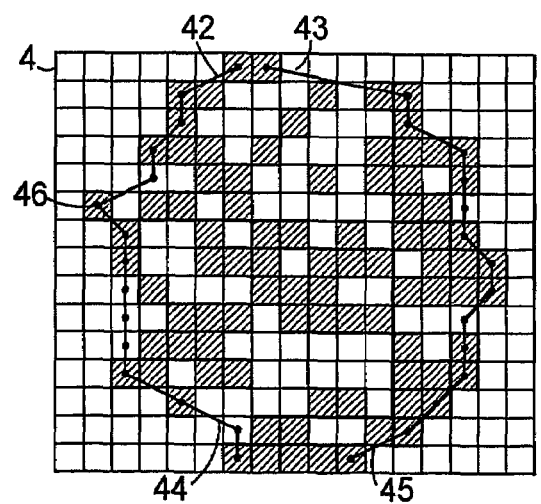

Generation of a region of interest with an anisotropic convex hull, which is performed in program steps 29 to 31 (FIG. 3) is explained in more detail with reference to FIG. 5. FIG. 5 shows the total image surface 4 split into tiles, wherein the hatched tiles form the preliminary region of interest. Four pointers are generated in total, of which two pointers 42, 43 start in the top row and two pointers 44, 45 start in the bottom row, each one then being moved row by row downwards or upwards respectively. The pointers 42 to 44 are positioned in the particular row on the outermost left- or right-hand tile, but cannot be shifted to the right or left respectively. In this way, a path is produced for the pointer 42 up to the point 46 and a path for the pointer 44 up to the same point, at which they meet. The same is done with the pointers 43 and 45. The paths traveled by the pointers represent the left and right borders of the final region of interest. Apart from negligible deviations, the final region of interest is thus free of "inlets" and holes.

The invention claimed is:

1. A method of determining the region of interest in images of skin impressions, the skin having ridges and valleys and the images taking the form of image data, values within a first value range being assigned to the ridges and values within a second value range of the image data being assigned to the valleys, characterized in that the values of the overall image are shifted in the direction of the first value range, in that the overall image is divided into tiles, in that mean values of the shifted values for the individual tiles are compared with a reference value and in that those tiles whose mean value deviates relative to the reference value in the direction of the first value range are considered at least on a preliminary basis as belonging to the region of interest, wherein to shift the values, each tile is split into a plurality of groups of pixels distributed extensively uniformly over the tiles, in that, for each tile and each group, the minimum of the corresponding values is formed, in that, for each tile, the mean value is calculated by means of the minimum values of the groups and in that the mean value is stored as a property of the respective tile.

2. A method as claimed in claim 1, characterized in that, for the tiles not yet deemed to belong to the region of interest, the variance of the gray scale values within each tile in the unchanged image data is calculated and in that an evaluation of these tiles is effected as a function of the mean value, the variance and a reference value in such a way that a difference between the mean value and the reference value, which in itself indicates lack of belonging to the region of interest, may be compensated by an appropriately large variance and a difference which indicates belonging to the region of interest may be compensated by an appropriately small variance.

3. A method as claimed in claim 2, characterized in that each tile is then examined as to whether more than five or fewer than six of the tiles surrounding it have been assessed as belonging to the region of interest, wherein in the case of more than five the examined tile is assessed as belonging to the region of interest and in the case of fewer than six the examined tile is assessed as not belonging to the region of interest.

4. A method as claimed in claim 3, characterized in that the step as claimed in claim 2 is repeated three times.

5. A method as claimed in claim 4, characterized in that the hitherto determined region of interest is investigated for "inlets" and in that tiles lying in "inlets" are assumed to belong to the region of interest.

6. A method as claimed in claim 5, characterized in that, on each side of the hitherto determined region of interest, pointers starting from both ends of the side are in each case positioned on the outermost tile determined as belonging to the region of interest, wherein the pointers travel towards one another and row by row adopt the position of a tile lying further outwards or retain the same position in the case of an "inlet" and in that the path of the pointers until the pointers meet forms the respective border of the final region of interest.

* * * * *